(12) United States Patent
Theurer

(10) Patent No.: US 7,844,970 B2
(45) Date of Patent: Nov. 30, 2010

(54) METHOD AND APPARATUS TO CONTROL PRIORITY PREEMPTION OF TASKS

(75) Inventor: Andrew Matthew Theurer, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1066 days.

(21) Appl. No.: 11/466,156

(22) Filed: Aug. 22, 2006

(65) Prior Publication Data

US 2008/0052716 A1 Feb. 28, 2008

(51) Int. Cl.
*G06F 9/46* (2006.01)
(52) U.S. Cl. .................. 718/103; 718/102; 718/107
(58) Field of Classification Search .................. 718/102, 718/103, 107
See application file for complete search history.

(56) References Cited

U.S. PATENT DOCUMENTS

| 5,072,376 | A | * | 12/1991 | Ellsworth | 718/105 |
| 5,630,128 | A | | 5/1997 | Farrell et al. | |
| 5,640,563 | A | * | 6/1997 | Carmon | 718/102 |
| 5,774,718 | A | * | 6/1998 | Aoshima et al. | 718/100 |
| 6,189,070 | B1 | * | 2/2001 | See et al. | 711/103 |
| 6,349,321 | B1 | * | 2/2002 | Katayama | 718/103 |
| 6,421,702 | B1 | * | 7/2002 | Gulick | 718/102 |
| 6,438,704 | B1 | * | 8/2002 | Harris et al. | 713/502 |
| 6,754,690 | B2 | * | 6/2004 | Larson | 718/102 |
| 7,458,077 | B2 | * | 11/2008 | Duke | 718/102 |
| 7,613,897 | B2 | * | 11/2009 | Armstrong et al. | 711/173 |
| 2003/0208521 | A1 | | 11/2003 | Brenner et al. | |
| 2006/0230400 | A1 | * | 10/2006 | Armstrong et al. | 718/1 |

OTHER PUBLICATIONS

Eggert et al, "Idletime Scheduling With Preemption Intervals", ACM 2005, pp. 249-262.*
Abraham, "Priority Scheduling on a Multilevel Computer", IBM Technical Disclosure Bulletin, Apr. 1979, pp. 4582-4583.

* cited by examiner

*Primary Examiner*—Chat C Do
*Assistant Examiner*—Jennifer N To
(74) *Attorney, Agent, or Firm*—Yee & Associates, P.C.; Matthew W. Baca

(57) ABSTRACT

A computer implemented method, apparatus, system, and computer usable program product for controlling preemption rates. A scheduler identifies a preemption interval in response to a plurality of processes being executed by a processor. Only a single preemption of a process occurs during the preemption interval. The scheduler preempts a currently running process only once during the preemption interval. The preemption interval is adjusted to increase performance in executing processes.

18 Claims, 4 Drawing Sheets

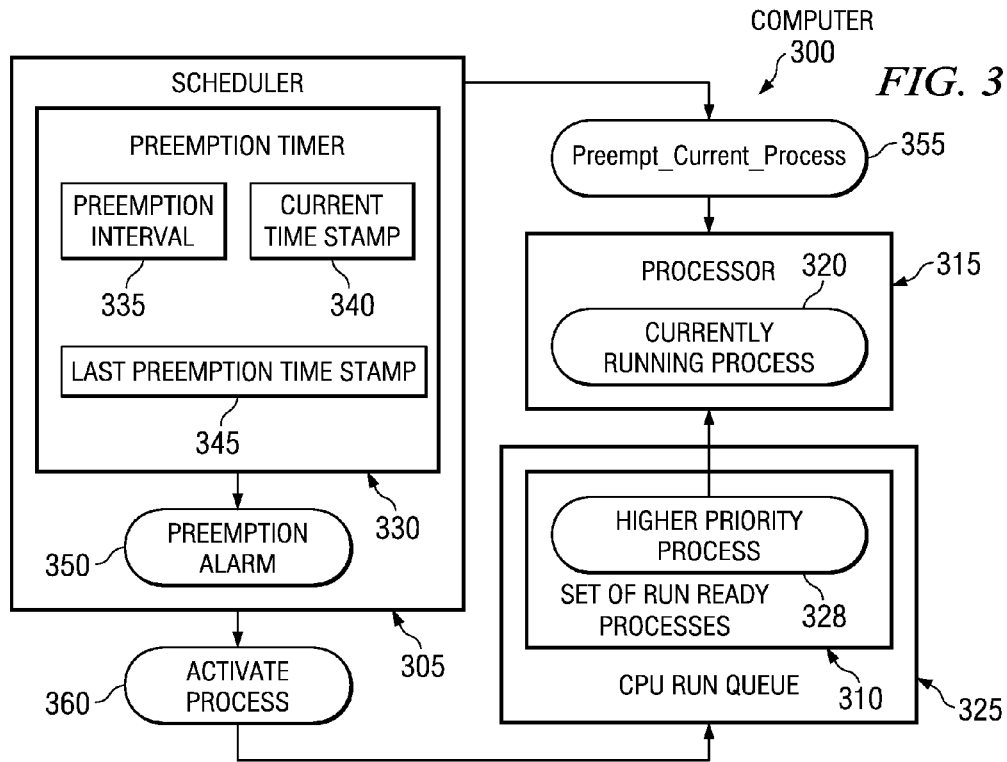

FIG. 3

```
                                                                ALGORITHM
            <event which triggers process a activation>        /600         FIG. 6
            activate_process(a, this_cpu)
    602 ─── if ( higher_priority(a, current_process) ) {
                    If ( current_timestamp(this_cpu) - last_preemption_timestamp(this_cpu) ≥
    604 {   preempt_interval ) {
                            put_preemption_timestamp(current_timestamp(this_cpu))
                            preempt_current_process(a, this_cpu)
            } else {
    606 {           set_preemption_alarm(current_timestamp(this_cpu) +
            (current_timestamp(this_cpu) - last_preemption_timestamp(this_cpu))
            }
```

```
                                                ALGORITHM
                                               /700
    702 ── <preemption alarm triggered>                          FIG. 7
    704 ── put_preemption_timestamp(this_cpu)
    706 ── preempt_current_process(find_highest_prio_process(this_cpu), this_cpu)

708 ── preempt_interval would be user definable
```

METHOD AND APPARATUS TO CONTROL PRIORITY PREEMPTION OF TASKS

BACKGROUND

1. Field of the Invention

The present application relates generally to an improved data processing system and in particular, to a computer implemented method, apparatus, system, and computer usable program code for scheduling processes. Still more particularly, the present invention relates to a computer implemented method, apparatus, and computer usable program code for controlling the priority preemption of process execution in a data processing system.

2. Description of the Related Art

Multitasking is a method by which multiple processes can share common processing resources, such as a central processing unit (CPU). A single central processing unit or processor can only execute a single process at any given point in time. As used herein, a process is a running instance of a program, a task, thread, or other item of work to be performed by a processor. The term "running" refers to a processor actively executing the instructions of a process.

During multitasking, a scheduler schedules which process will be the one process running at a given time and when another process waiting for execution will be run by the processor. Typically, a processor is scheduled to switch execution between the processes waiting for execution to give the appearance that many processes are executing simultaneously on the same processor.

For example, if a processor has two processes to execute, the scheduler will assign the processor to run the first process for a given time period, then assign the processor to switch to executing the second process for a given time period, and then switch back to executing the first process to give the appearance that both processes are being executed at the same time. The act of reassigning a processor from executing one process to another process is called a context switch. When context switches occur frequently enough, the illusion of simultaneous processing is achieved.

The scheduler typically schedules processes for execution according to the priority of the process. In other words, a process that has a higher priority is scheduled for execution by the processor before a process with a lower priority. The priority of a process is determined by the scheduler based on user defined priorities for processes, the type of process, and/or process behavior. For example, a process that requires greater execution time may be given a lower priority than a process that requires less time for execution.

In some cases, a higher priority process becomes ready for execution after another process has already been assigned to the processor for execution. In such a case, the scheduler can use priority preemption. Priority preemption provides a scheduler with the ability to assign a process that is ready to run in place of another lower priority process that is already running. Priority preemption refers to preempting an existing process because a new process with a higher priority is ready to run. Preempting an existing process refers to stopping execution of the currently running process.

In other words, if a new process becomes ready for execution and the new process has a greater priority than a process that is already being executed by the processor, the scheduler can preempt or stop execution of the current process to permit execution of the new higher priority process to begin.

A scheduler will preempt a current process when a preemption point is detected. A preemption point is the point when a new process becomes run ready and the new process is determined to have a higher priority than the current running process. The scheduler performs a context switch from the current process to the new process each time a preemption point is detected.

The scheduler performs a context switch by suspending execution of the current process, initiating execution of the new higher priority process, and flushing the translation look-aside buffer (TLB) if the new higher priority process does not share the same virtual memory address space as the preempted process.

The process of priority preemption provides the appearance of simultaneous multitasking through low scheduling latency. However, high rates of priority preemption can cause reduction in cache warmth, increases in translation look-aside buffer misses where the new process does not share the same virtual memory address space, and wastes processor cycles on excessive context switches.

SUMMARY

The illustrative embodiments provide a computer implemented method, apparatus, system, and computer usable program product for controlling preemption rates. A scheduler identifies a preemption interval in response to a plurality of processes being executed by a processor. Only a single preemption of a process occurs during the preemption interval. The scheduler preempts a currently running process only once during the preemption interval. The preemption interval is adjusted to increase performance in executing processes.

BRIEF DESCRIPTION OF THE DRAWINGS

The novel features believed characteristic of the illustrative embodiments are set forth in the appended claims. The illustrative embodiments themselves, however, as well as a preferred mode of use, further objectives and advantages thereof, will best be understood by reference to the following detailed description of the illustrative embodiments when read in conjunction with the accompanying drawings, wherein:

FIG. 3 is a block diagram illustrating a dataflow when a preemption rate scheduler throttles a rate of preemption in accordance with an illustrative embodiment;

FIG. 6 is an example of code for controlling a rate of preemption of a currently executing process in accordance with an illustrative embodiment; and FIG. 7 is an example of code for preempting a currently executing process in response to receiving a preemption trigger in accordance with an illustrative embodiment.

DETAILED DESCRIPTION OF THE PREFERRED EMBODIMENT

Figure 1:
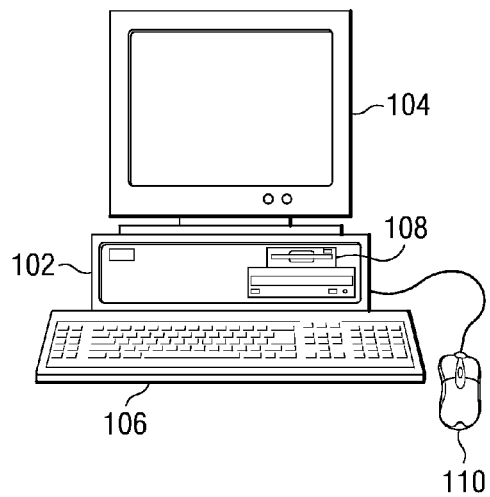
FIG. 1 is a pictorial representation of a data processing system in which illustrative embodiments may be implemented.

With reference now to the figures and in particular with reference to FIG. 1, a pictorial representation of a data processing system is shown in which illustrative embodiments may be implemented. Computer 100 includes system unit 102, video display terminal 104, keyboard 106, storage devices 108, which may include floppy drives and other types of permanent and removable storage media, and mouse 110. Additional input devices may be included with personal computer 100. Examples of additional input devices include a joystick, touchpad, touch screen, trackball, microphone, and the like.

Computer 100 may be any suitable computer, such as an IBM® eServer™ computer or IntelliStation® computer, which are products of International Business Machines Corporation, located in Armonk, N.Y. Although the depicted representation shows a personal computer, other embodiments may be implemented in other types of data processing systems. For example, other embodiments may be implemented in a network computer. Computer 100 also preferably includes a graphical user interface (GUI) that may be implemented by means of systems software residing in computer readable media in operation within computer 100.

Figure 2:
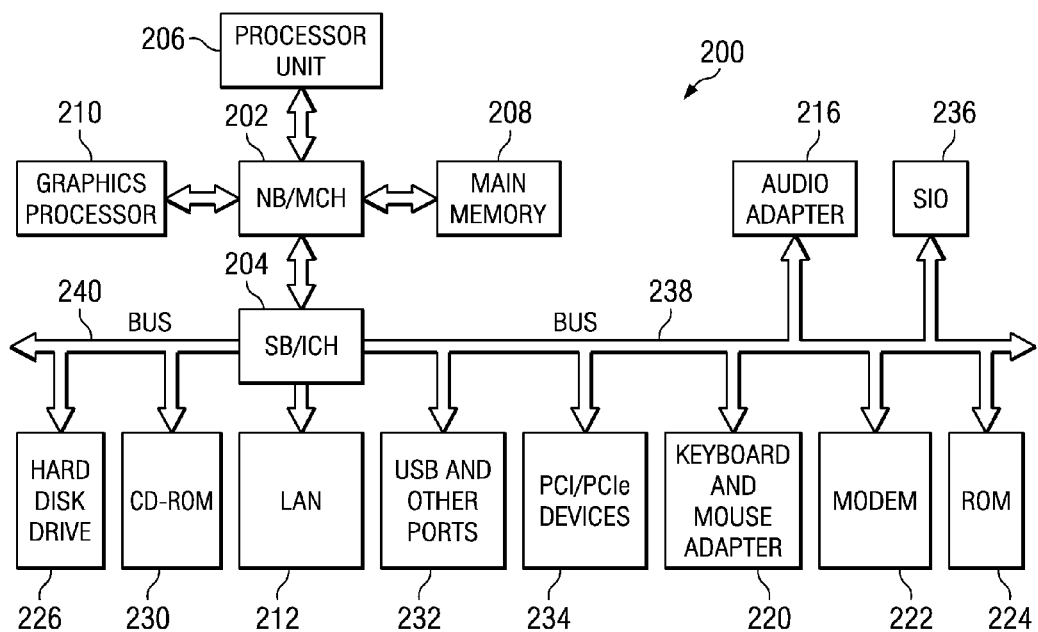
FIG. 2 is a block diagram of a data processing system in which illustrative embodiments may be implemented.

Next, FIG. 2 depicts a block diagram of a data processing system in which illustrative embodiments may be implemented. Data processing system 200 is an example of a computer, such as computer 100 in FIG. 1, in which code or instructions implementing the processes of the illustrative embodiments may be located.

In the depicted example, data processing system 200 employs a hub architecture including a north bridge and memory controller hub (MCH) 202 and a south bridge and input/output (I/O) controller hub (ICH) 204. Processor 206, main memory 208, and graphics processor 210 are coupled to north bridge and memory controller hub 202. Graphics processor 210 may be coupled to the memory controller hub (MCH) through an accelerated graphics port (AGP), for example.

In the depicted example, local area network (LAN) adapter 212 is coupled to south bridge and I/O controller hub 204, audio adapter 216, keyboard and mouse adapter 220, modem 222, read only memory (ROM) 224, universal serial bus (USB) ports, and other communications ports 232. PCI/PCIe devices 234 are coupled to south bridge and I/O controller hub 204 through bus 238. Hard disk drive (HDD) 226 and CD-ROM drive 230 are coupled to south bridge and I/O controller hub 204 through bus 240.

PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processor 206. This operating system coordinates and controls various components within data processing system 200 in FIG. 2. The operating system may be a commercially available operating system, such as Microsoft® Windows XP®. (Microsoft® and Windows XP® are trademarks of Microsoft Corporation in the United States, other countries, or both). An object oriented programming system, such as the Java™ programming system, may run in conjunction with the operating system and provides calls to the operating system from Java™ programs or applications executing on data processing system 200. Java™ and all Java-based trademarks are trademarks of Sun Microsystems, Inc. in the United States, other countries, or both.

Instructions for the operating system, the object-oriented programming system, and applications or programs are located on storage devices, such as hard disk drive 226. These instructions and may be loaded into main memory 208 for execution by processor 206. The processes of the illustrative embodiments may be performed by processor 206 using computer implemented instructions, which may be located in a memory. An example of a memory is main memory 208, read only memory 224, or in one or more peripheral devices.

The hardware shown in FIG. 1 and FIG. 2 may vary depending on the implementation of the illustrated embodiments. Other internal hardware or peripheral devices, such as flash memory, equivalent non-volatile memory, or optical disk drives and the like, may be used in addition to or in place of the hardware depicted in FIG. 1 and FIG. 2. Additionally, the processes of the illustrative embodiments may be applied to a multiprocessor data processing system.

The systems and components shown in FIG. 2 can be varied from the illustrative examples shown. In some illustrative examples, data processing system 200 may be a personal digital assistant (PDA). A personal digital assistant generally is configured with flash memory to provide a non-volatile memory for storing operating system files and/or user-generated data. Additionally, data processing system 200 can be a tablet computer, laptop computer, or telephone device.

Other components shown in FIG. 2 can be varied from the illustrative examples shown. For example, a bus system may be comprised of one or more buses, such as a system bus, an I/O bus, and a PCI bus. Of course the bus system may be implemented using any suitable type of communications fabric or architecture that provides for a transfer of data between different components or devices attached to the fabric or architecture. Additionally, a communications unit may include one or more devices used to transmit and receive data, such as a modem or a network adapter. Further, a memory may be, for example, main memory 208 or a cache such as found in north bridge and memory controller hub 202. Also, a processing unit may include one or more processors or CPUs.

The depicted examples in FIG. 1 and FIG. 2 are not meant to imply architectural limitations. In addition, the illustrative embodiments provide for a computer implemented method, apparatus, system, and computer usable program code for compiling source code and for executing code. The methods described with respect to the depicted embodiments may be performed in a data processing system, such as data processing system 100 shown in FIG. 1 or data processing system 200 shown in FIG. 2.

Multitasking is a method by which multiple processes can share common processing resources, such as a central processing unit (CPU). During multitasking, a scheduler schedules which process will be the one process running at a given time and when another process waiting for execution will be run by the processor. Typically, a processor is scheduled to switch execution between the processes waiting for execution to give the appearance that many processes are executing simultaneously on the same processor. The act of reassigning a processor from executing one process to another process is called a context switch. When context switches occur frequently enough, the illusion of simultaneous processing is achieved.

The scheduler typically schedules processes for execution according to the priority of the process. In other words, a process that has a higher priority is scheduled for execution by the processor before a process with a lower priority. The priority of a process is determined by the scheduler based on user defined priorities for processes, the type of process, and/or process behavior.

Priority preemption provides a scheduler with the ability to assign a process that is ready to run in place of another lower priority process that is already running. In other words, if a new process becomes ready for execution and the new process has a greater priority than a process that is already being executed by the processor, the scheduler can preempt or stop execution of the current process to permit execution of the new higher priority process to begin.

A scheduler will preempt a current process when a preemption point is detected. A preemption point is the point when a new process becomes run ready and the new process is determined to have a higher priority than the current running process. The scheduler performs a priority preemption each time a preemption point is detected. However, high rates of context switches can cause reduction in cache warmth, increases in translation look-aside buffer misses where the new process does not share the same virtual memory address space, and wastes processor cycles on excessive context switches.

The illustrative embodiments recognize that limiting the rate of context switches will promote more efficient cache utilization and increased translation look-aside buffer hit rates. Therefore, the aspects of the illustrative embodiment provide a computer implemented method, apparatus, system, and computer usable program product for controlling preemption of processes.

A scheduler receives a new process that is a higher priority than a currently running process to form a higher priority process. The scheduler determines whether the new process is a higher priority process than the currently running process based on a comparison of a priority value for the new process and a priority value for the currently running process. In this example, the priority value is a predefined value associated with a given process. However, in accordance with another embodiment, the priority value is dynamically calculated by the scheduler based on the type of process, the history of execution time for the process, the input/output requirements for the process, the response requirements for the process, and the processing performance of the currently executing process. For example, a process that is input/output dependent may require greater processing time. Therefore, in response to determining that a process is input/output dependent, the scheduler may calculate a lower priority than if the process was less input/output dependent.

The currently running process is a process executing at a processor and wherein the higher priority process is a process that is ready for execution by a processor. The scheduler retrieves a predefined preemption interval. The predefined preemption interval is a minimum time interval before a priority preemption of a currently running process. The scheduler performs a priority preemption of the currently running process in response to a determination that the preemption interval has expired.

The currently running process is only preempted if the preemption interval has expired. In this manner, the rate of context switches is controlled by only permitting one preemption during the predefined time interval.

In other words, the illustrative embodiments provide a computer implemented method, apparatus, system, and computer usable program product for controlling preemption rates. A scheduler identifies a preemption interval in response to a plurality of processes being executed by a processor. Only a single preemption of a process occurs during the preemption interval. The scheduler preempts a currently running process only once during the preemption interval. The preemption interval is adjustable. The preemption interval is adjusted to increase performance in executing processes. The preemption interval may be adjusted at any time, including prior to executing a process, during execution of a process, or following execution of a process.

Turning now to FIG. 3, a block diagram illustrating a dataflow when a preemption rate scheduler throttles a rate of preemption in accordance with an illustrative embodiment. Computer 300 is any type of computing device, such as a personal computer, laptop, personal digital assistant, or any other computing device depicted in FIGS. 1 and 2.

Scheduler 305 is a software component that controls the scheduling of set of run ready processes 310 on processor 315. Set of run ready processes 310 is a set of one or more processes that are ready for execution on a processor, such as processor 315.

Processor 315 is a component, such as a central processing unit, that executes instructions and processes data. Processor 315 is a processor such as processor unit 206 in FIG. 2.

Currently running process 320 is a process that is currently executing on processor 315. A loader sends a process that is ready for execution on processor 315 to scheduler 305. Scheduler 305 places the new process in CPU run queue 325. Scheduler 305 determines if the new process is a higher priority process than currently running process 320. CPU run queue is a queue in an area of memory, such as main memory 208 in FIG. 2 or a cache memory, for storing processes that are waiting to be executed on processor 315.

If scheduler 305 determines that the new process is a higher priority process than currently running process 320, the new process is a higher priority process, such as higher priority process 328. A priority preemption of currently running process 320 will be performed to stop execution of currently running process 320 and activate execution of higher priority process 328 if a predefined preemption interval has expired.

Preemption timer 330 is a software component that determines when a preemption interval, such as preemption interval 335, has expired. Preemption interval 335 is a minimum time interval before a priority preemption of a currently running process is will occur.

Preemption interval 335 is not a single unchanging value, but is in fact an adjustable value. The preemption interval value will vary depending on the data processing system, the application being executed, the processor executing the application, the execution time for each process associated with the application, and any other factors that could influence the processing performance associated with an application executing on a data processing system. Thus, a value for a preemption interval on one computer may be a different value than a preemption interval on a different computer. Likewise, a preemption interval value for one application executing on a data processing system may be a different value than the preemption interval value for a different application executing on the same data processing system.

Current time stamp 340 indicates a current time. Last preemption time stamp 345 indicates a last preemption time. A last preemption time is the time at which the most recently performed priority preemption took place. In other words, the time at which the last priority preemption took place is the last preemption time.

Scheduler 305 determines if preemption interval 335 has expired by subtracting last preemption time stamp 345 from current time stamp 340 to determine a current time interval. The current time interval is an interval of time since the last priority preemption took place. Scheduler 305 compares the current time interval to preemption interval 335. Preemption interval 335 is expired if the current time interval is greater than or equal to the preemption interval.

If scheduler 305 determines that preemption interval 335 has expired, scheduler 305 performs a priority preemption process, such as Preempt_Current_Process 355. Preempt_Current_Process 355 is a function to stop execution of currently running process 320 and activate execution of higher priority process 328.

In accordance with this illustrative embodiment, if scheduler 305 determines that preemption interval 335 has not yet expired, scheduler 305 sets preemption timer 330 to trigger preemption alarm 350 upon the expiration of preemption interval 335. Upon determining that preemption alarm 350 has been triggered, scheduler 305 then performs a priority preemption of currently running process 320. When a priority preemption occurs, a currently running process executing on a processor is preempted. When a currently running process is preempted, the execution of the currently running process is stopped so that the processor will be available to execute a higher priority process that is ready for execution.

When scheduler 305 performs a priority preemption of currently running process 320, scheduler 305 terminates execution by processor 315 of currently running process 320. Scheduler 305 activates execution of higher priority process 328 by sending activate process 360 to CPU run queue 325. Higher priority process 328 is a process that has a higher priority than currently running process 320.

Activate process 360 is a function for activating execution of the higher priority process by processor 315. When CPU run queue 325 receives activate process 360, higher priority process 328 in CPU run queue 325 is sent to processor 315. Higher priority process 328 becomes currently running process 320 when the execution of the higher priority process by processor 328 begins.

This preemption of currently running process 320 for execution of higher priority process 328 is the most recent preemption. Therefore, scheduler 305 sets last preemption time stamp 345 as the current time indicated by current time stamp 340. Thus, last preemption time stamp 345 continues to indicate the time of the most recent priority preemption.

In this illustrative example, preemption interval 335 is a user defined amount of time. The preemption interval is selected by a user. In accordance with another illustrative embodiment, preemption interval is a default amount of time that is not selected by a user.

In another example, preemption interval 335 is a user defined amount of time. However, if a user fails to specify an amount of time for the preemption interval, a predefined default amount of time is used by scheduler 305 as preemption interval 335.

In another illustrative embodiment, the preemption interval is a dynamic preemption interval. A value for the dynamic preemption interval is calculated by a scheduler based on an analysis of a history of preemptions. The history of preemptions is obtained during execution of an application in a data processing system. In accordance with this example, data regarding each preemption that takes place during execution of the application is stored in a data storage device, such as main memory 208 in FIG. 2.

The scheduler in a data processing system calculates an initial preemption interval value when a first preemption point is encountered. The scheduler updates or modifies this preemption interval value on a regular or constant bases based on the requirements and performance of the current application executing on the data processing system. For example, the scheduler can decrease the preemption interval or make the preemption interval shorter if the application requires increased response time.

In another embodiment, the predefined preemption interval value is updated or changed by a user to create an updated preemption interval. A user can change the preemption interval value to increase the preemption rate or increase the preemption interval value to decrease the preemption rate.

In another example, the predefined preemption interval value is updateable by the scheduler or any other program capable of modifying a preemption interval value to create an updated preemption interval. A scheduler or other program can modify the preemption interval value based on dynamic factors, such as processing time for one or more processes, processing performance, application requirements, and/or any other factors regarding processing of a currently executing application.

Thus, in accordance with the illustrative embodiments, a predefined preemption interval is an updateable preemption interval value that can be updated based on a history of preemption processes and/or changing application processing performance and changing application processing requirements.

In this illustrative example, scheduler 305 makes a determination as to whether a new process is a higher priority than currently running process 320. The new process is a process that is ready for execution by processor 315.

In this example, the determination as to whether the new process is a higher priority process is made based on a comparison of a predefined priority for the new process and a predefined priority for the currently running process. However, a determination as to whether a new process is a higher priority process could also be made in accordance with any other known or available method for determining whether one process has a higher priority than another process.

Likewise, a priority for a given process may be determined by any known or available method for determining a priority of a process, including but not limited to, checking a predefined priority for the process, assigning a priority based on a type of the process, an execution time for the process, or any other criteria for assigning a priority to a process.

Figure 4:
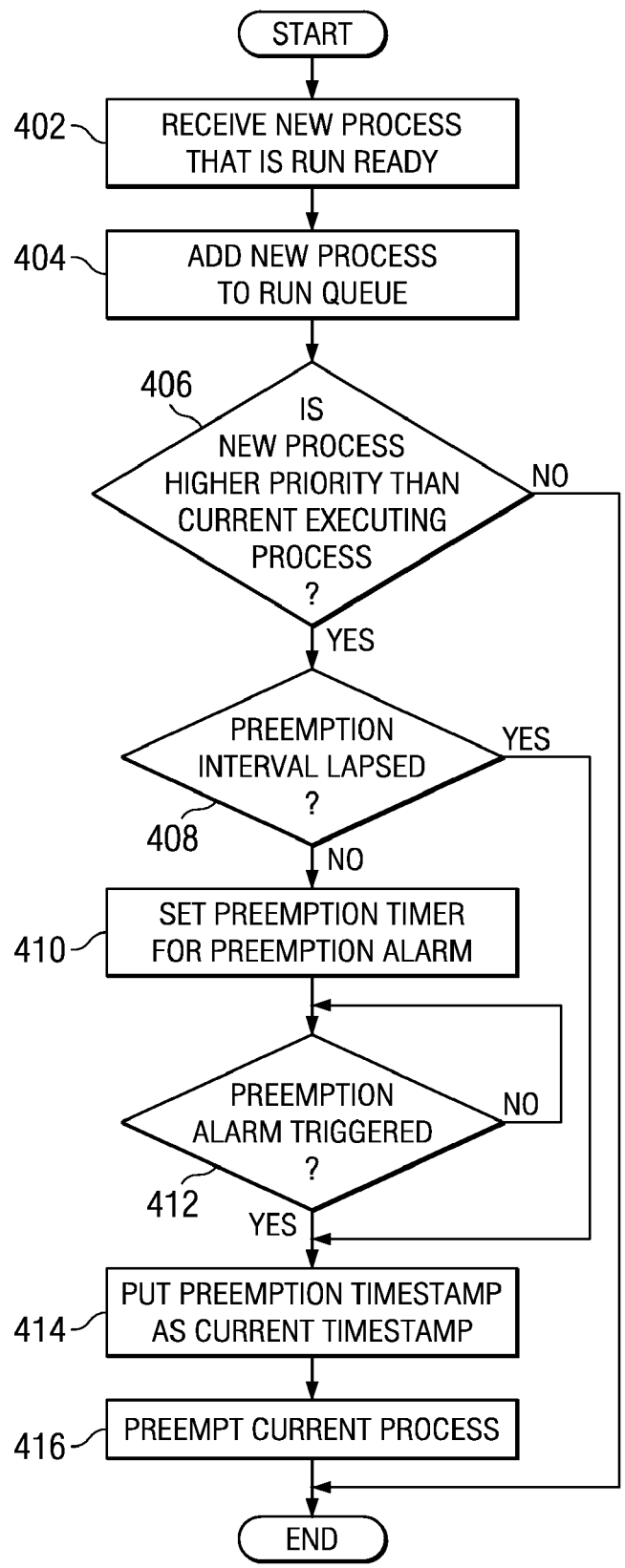
FIG. 4 is a flowchart illustrating a process for preempting a currently executing process in accordance with an illustrative embodiment.

FIG. 4 is a flowchart illustrating a process for preempting a currently executing process in accordance with an illustrative embodiment. In this illustrative example in FIG. 4, the process is implemented by a software component for scheduling processes for execution on a processor, such as scheduler 305 in FIG. 3.

The scheduler begins by receiving a new process that is run ready (step 402). A process is run ready if the process is ready for execution and/or waiting for execution by a processor. The scheduler adds the new process to a run queue to wait for execution on the processor (step 404).

The scheduler makes a determination as to whether the new process is a higher priority than a current executing process (step 406). If the new process is not a higher priority than the currently running process, a preemption of the currently running process is unnecessary and the process terminates thereafter.

If the scheduler determines that the new process is a higher priority process, the scheduler makes a determination as to whether a preemption interval has lapsed (step 408). In this example, the preemption interval is a user defined interval. However, the preemption interval may also include a default predefined preemption interval rather than a predefined user-defined preemption interval in accordance with this illustrative embodiment.

If the scheduler determines that the preemption interval has not lapsed, the scheduler sets a preemption timer to trigger a preemption alarm when the preemption interval has expired (step 410). The scheduler makes a determination as to whether the preemption alarm has been triggered (step 412). If the preemption alarm has not been triggered, the process returns to step 412 until the preemption alarm has triggered.

When a determination is made that the preemption alarm has been triggered at step 412 or a determination is made that the preemption interval has lapsed at step 408, the process puts or sets the last preemption time stamp as the current time stamp (step 414). The scheduler preempts the current process (step 416) by terminating execution of the currently running process and activating execution of the higher priority process by the processor, with the process terminating thereafter.

Thus, the scheduler sets a preemption timer in response to a determination that the preemption interval has not yet expired. The preemption timer expires at the end of the preemption interval. The scheduler performs a preemption of the currently running process in response to determining that the preemption timer has expired. The expiration of the preemption timer can be indicated by the preemption timer generating an alarm, such as a preemption alarm.

Figure 5:
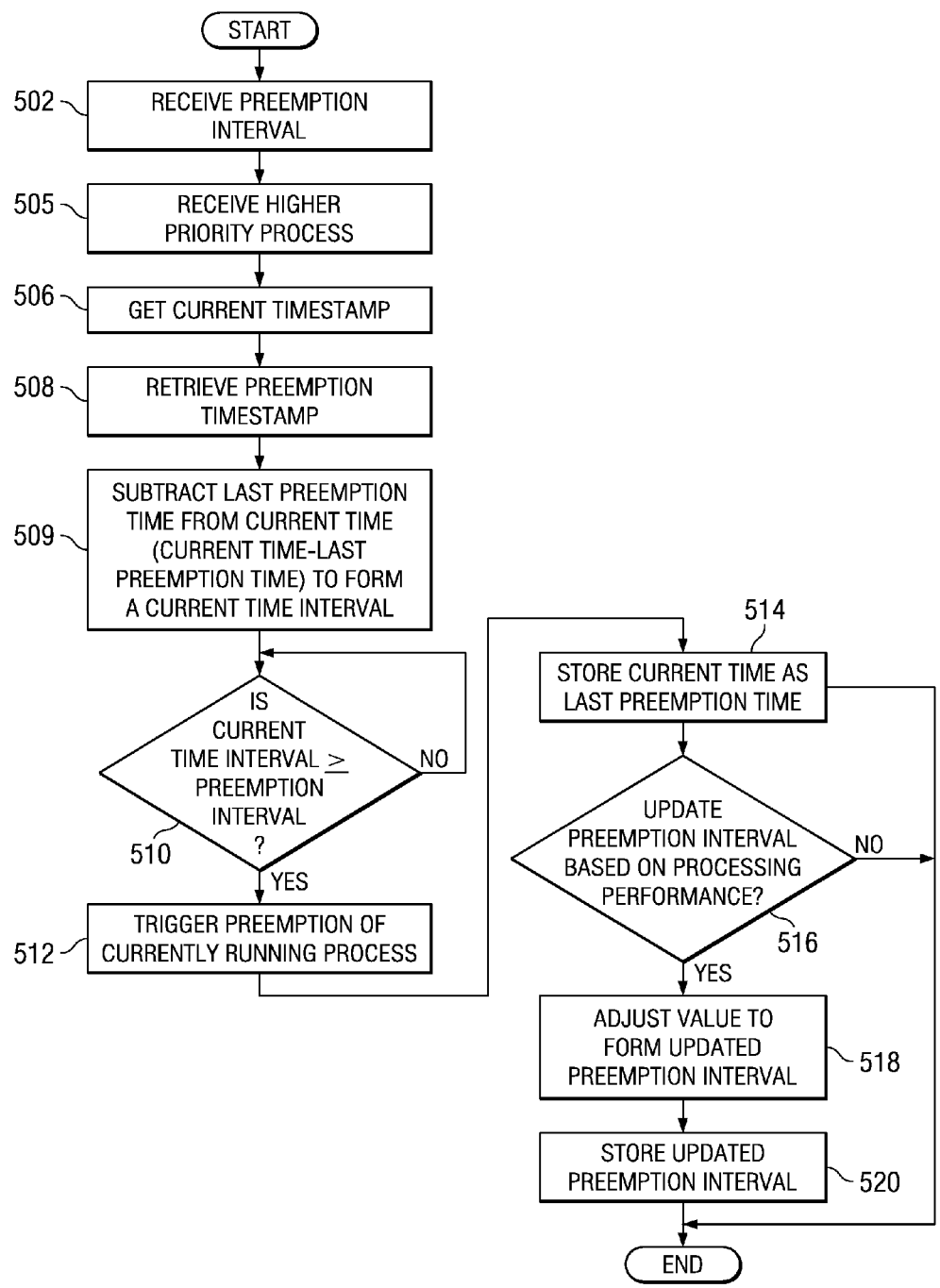
FIG. 5 is a flowchart illustrating a process for determining whether to trigger a preemption of a currently executing process in accordance with an illustrative embodiment.

Referring now to FIG. 5, a flowchart illustrating a process for determining whether to trigger a preemption of a currently executing process is shown in accordance with an illustrative embodiment. In this illustrative example in FIG. 5, the process is implemented by a software component for determining whether a preemption interval has expired prior to triggering a preemption process, such as scheduler 305 in FIG. 3.

The scheduler receives a preemption interval (step 502). The preemption interval is a preemption interval such as preemption interval 335 in FIG. 3. The preemption interval may be a user defined preemption interval, or a default preemption interval. The preemption interval is adjustable and user definable. Therefore, the preemption interval may be changed by a user and/or updated by the scheduler.

The scheduler receives a process that is determined to be a higher priority process than the currently running process that is being executed by a processor (step 505). The higher priority process is a process that is ready for execution by the processor.

The scheduler retrieves a current time (step 506). The scheduler retrieves a last preemption time for the last time a preemption of a currently running process was performed (step 508). The process subtracts the last preemption time from the current time to form a current time interval (step 509).

The process determines whether the current time interval is greater than or equal to the preemption interval (step 510). If the current time interval is not greater than or equal to the preemption interval, the process returns to step 510 until the current time interval is greater than or equal to the preemption interval.

When the current time interval is greater than or equal to the preemption interval, the preemption interval has lapsed and the scheduler triggers a preemption of the currently running process (step 512). The scheduler then stores the current time as the last preemption time (step 514) for use in determining the expiration of the next preemption time interval.

The scheduler makes a determination as to whether to update the preemption interval based on processing performance (step 516). If the process determines that the preemption interval should not be adjusted, the process terminates thereafter.

Returning to step 516, if the scheduler makes a determination that the preemption interval should be updated, the scheduler adjusts the preemption interval value to form an updated preemption interval (step 518). The scheduler stores the updated preemption interval value in a memory location, such as a database or secondary storage device, with the process terminating thereafter.

In this example, the preemption interval is updated during execution of a plurality of processes associated with an application running on a computer, such as computer 300 in FIG. 3. The updated preemption interval value is stored in memory for use in a future priority preemption determination as to whether a next current preemption interval is greater than or equal to the updated preemption interval.

Although the example in FIG. 5 provides for adjusting the preemption interval after a preemption of a current running process has taken place, a preemption interval can be adjusted or updated at anytime during the process depicted in FIG. 5. The preemption interval is adjusted by a user, the scheduler, and/or another software component for updating the preemption interval in order to form an updated preemption interval.

FIG. 6 is an example of code algorithm for controlling a rate of preemption of a currently executing process in accordance with an illustrative embodiment. In this illustrative example, code 600 is executed by a software component for scheduling process, such as scheduler 305 in FIG. 3. Code 600 is pseudocode that can be implemented in C programming language, C++ programming language, Fortran, or any other known or available programming language.

Line 602 is an algorithm for determining if a new process waiting for execution has a higher priority than a currently running process. If the new process is a higher priority process, the algorithm determines if the current preemption interval, determined by subtracting the last preemption time from the current time, is greater than or equal to the preemption interval in section 604 of code 600.

If the current preemption interval is not greater than or equal to the preemption interval, the algorithm sets a preemption alarm to trigger when the preemption interval has expired in section 606.

Referring now to FIG. 7, an exemplary algorithm for preempting a currently executing process in response to receiving a preemption trigger is shown in accordance with an illustrative embodiment. In this illustrative example, algorithm 700 is executed by a software component for scheduling processes, such as scheduler 305 in FIG. 3. Code 600 in FIG. 6 is pseudocode that can be implemented in C programming language, C++ programming language, Fortran, or any other known or available programming language.

Code 702 is an algorithm to be performed when a preemption alarm is triggered indicating that the preemption interval has lapsed. The last preemption time stamp is set with the current time to indicate the time of the most recent priority preemption that is being triggered at code 704. The algorithm preempts the currently running process and activates the higher priority process at code 706.

In this illustrative example, the preemption interval is a user defined interval, as indicated at code 708. However, in accordance with the illustrative embodiments, the preemption interval may include a programmer defined preemption interval, or a default preemption interval.

Thus, the illustrative embodiments provide a computer implemented method, apparatus, system, and computer usable program product for controlling preemption of processes. A scheduler receives a new process that is a higher priority than a currently running process to form a higher priority process. The currently running process is a process executing at a processor and wherein the higher priority process is a process that is ready for execution by a processor. The scheduler retrieves a preemption interval. The preemption interval is a minimum time interval before a priority preemption of a currently running process. The scheduler performs a priority preemption of the currently running process in response to a determination that the preemption interval has expired.

Controlling the rate of priority preemptions promotes better cache hit rates and reduces translation look-aside buffer misses. The process of the illustrative embodiments introduces preemption rate control by only allowing one preemption during a preemption interval. By allowing only one preemption during a given time interval, a data processing system can promote better cache warmth, lower context switch CPU overhead, and higher translation look-aside buffer hit rates.

In addition, the preemption time interval is user definable so that systems with very high response requirements may use very short preemption intervals while data processing systems which do not need high response requirements can increase the preemption interval.

The flowchart and block diagrams in the figures illustrate the architecture, functionality, and operation of some possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The illustrative embodiments can take the form of an entirely hardware embodiment, an entirely software embodiment or an embodiment containing both hardware and software elements. The illustrative embodiments are implemented in software, which includes but is not limited to firmware, resident software, microcode, etc.

Furthermore, the illustrative embodiments can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

A medium can be an electronic, magnetic, optical, electromagnetic, infrared, or semiconductor system (or apparatus or device) or a propagation medium. A computer-readable medium includes a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O schedulers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the illustrative embodiments have been presented for purposes of illustration and description, and is not intended to be exhaustive or limited to the illustrative embodiments in the form disclosed. Many modifications and variations will be apparent to those of ordinary skill in the art. The embodiment was chosen and described in order to best explain the principles of the illustrative embodiments, the practical application, and to enable others of ordinary skill in the art to understand the illustrative embodiments for various embodiments with various modifications as are suited to the particular use contemplated.

The invention claimed is:

1. A computer implemented method for controlling preemption rates, the computer implemented method comprising:

responsive to a plurality of processes being executed by a processor, determining a preemption interval, wherein the preemption interval is a minimum time interval before a priority preemption of a currently running process by a higher priority process occurs;

subtracting a last preemption time from a current time to determine a current time interval, wherein the current time interval is an interval of time since a most recently performed priority preemption of a process took place;

determining whether the preemption interval has expired, wherein the preemption interval has expired if the current time interval is greater than or equal to the preemption interval;

preempting the currently running process in response to a determination that the preemption interval has expired, wherein the preemption interval is adjusted upon determining that adjusting the preemption interval will reduce time in executing processes; and responsive to performing the priority preemption, setting the last preemption time as the current time, wherein the last preemption time is a time at which the most recently performed priority preemption of a process took place.

2. The computer implemented method of claim 1 further comprising:

setting a preemption timer, wherein the preemption timer expires at the end of the preemption interval; and responsive to a determination that the preemption interval has expired, performing a preemption of the currently running process.

3. The computer implemented method of claim 1 further comprising:

responsive to determining that adjusting the preemption interval will reduce time in executing the plurality of processes, adjusting the preemption interval to form an updated preemption interval.

4. The computer implemented method of claim 1 further comprising:

terminating execution of the currently running process; and activating execution of a higher priority.

5. The computer implemented method of claim 1 wherein the preemption interval is a user defined amount of time.

6. The computer implemented method of claim 1 wherein the preemption interval is a default amount of time.

7. The computer implemented method of claim 1 further comprising:

receiving a new process that is a higher priority process than the currently running process;

adding the new process to a run queue associated with the processor; and preempting the currently running process if the preemption interval has expired.

8. The computer implemented method of claim 1 further comprising:

determining whether the new process is a higher priority process than a currently running process based on a comparison of a predefined priority value for the new process and a predefined priority value for the currently running process.

9. The computer implemented method of claim 1, wherein adjusting the preemption interval increases cache utilization.

10. The computer implemented method of claim 1, wherein adjusting the preemption interval increases translation look-aside buffer hit rates.

11. An apparatus for controlling preemption rates, the apparatus comprising:
a computer comprising:
a storage device connected to a bus, wherein the storage device contains a computer usable program product; and
a processor, wherein the processor unit executes the computer usable program code to determine a preemption interval in response to a plurality of processes being executed by a processor, wherein the preemption interval is a minimum time interval before a priority preemption of a currently running process by a higher priority process occurs; wherein the processor subtracts a last preemption time from a current time to determine a current time interval, wherein the current time interval is an interval of time since a most recently performed priority preemption of a process took place; wherein the processor determines whether the preemption interval has expired, wherein the preemption interval has expired if the current time interval is greater than or equal to the preemption interval; wherein the processor preempts a currently running process in response to a determination that the preemption interval has expired, wherein the preemption interval is adjusted upon determining that adjusting the preemption interval will reduce time in executing processes; and wherein responsive to performing the priority preemption, the processor sets the last preemption time as the current time, wherein the last preemption time is a time at which the most recently performed priority preemption of a process took place.

12. A computer program product comprising:
a computer readable medium including computer usable program code for controlling preemption rates, said computer program product comprising:
computer usable program code for determining a preemption interval, wherein the preemption interval is a minimum time interval before a priority preemption of a currently running process by a higher priority process occurs, in response to a plurality of processes being executed by a processor;
computer usable program code for subtracting a last preemption time from a current time to determine a current time interval, wherein the current time interval is an interval of time since a most recently performed priority preemption of a process took place;
computer usable program code for determining whether the preemption interval has expired, wherein the preemption interval is expired if the current time interval is greater than or equal to the preemption interval;
computer usable program code for preempting the currently running process in response to a determination that the preemption interval has expired, wherein the preemption interval is adjusted upon determining that adjusting the preemption interval will reduce time in executing processes; and
computer usable program code for responsive to performing the priority preemption, setting the last preemption time as the current time, wherein the last preemption time is a time at which the most recently performed priority preemption of a process took place.

13. The computer program product of claim 12 further comprising:
computer usable program code for setting a preemption timer, wherein the preemption timer expires at the end of the preemption interval; and
computer usable program code for performing a preemption of the currently running process in response to a determination that the preemption timer has expired.

14. The computer program product of claim 12 further comprising:
computer usable program code for adjusting the preemption interval to form an updated preemption interval, responsive to determining that adjusting the preemption interval will reduce time in executing the plurality of processes.

15. The computer program product of claim 12 further comprising:
computer usable program code for terminating execution of the currently running process; and
computer usable program code for activating execution of a higher priority process.

16. The computer program product of claim 12 wherein the preemption interval is a user defined amount of time.

17. The computer program product of claim 12 further comprising:
computer usable program code for receiving a new process that is a higher priority process than the currently running process;
adding a new process to a run queue associated with the processor; and
preempting the currently running process if the preemption interval has expired.

18. A system for controlling preemption rates, the system comprising:
a processor, wherein the processor is executing a process in a plurality of processes waiting to be executed to form a currently running process; and
a scheduler, wherein the scheduler determines a preemption interval and preempts the currently running process, wherein the preemption interval is a minimum time interval before a priority preemption of the currently running process by a higher priority process occurs, wherein the scheduler subtracts a last preemption time from a current time to determine a current time interval, wherein the current time interval is an interval of time since a most recently performed priority preemption of a process took place; wherein the scheduler determines whether the preemption interval has expired, wherein the preemption interval has expired if the current time interval is greater than or equal to the preemption interval; wherein the currently running process is preempted in response to a determination that the preemption interval has expired, and wherein the preemption interval is adjusted upon determining that adjusting the preemption interval will reduce time in executing processes, and wherein responsive to performing the priority preemption, the scheduler sets the last preemption time as the current time, wherein the last preemption time is a time at which the most recently performed priority preemption of a process took place.

* * * * *